United States Patent
Kubli et al.

(10) Patent No.: US 12,307,175 B2
(45) Date of Patent: May 20, 2025

(54) METHOD AND DEVICE FOR GEOMETRIC ANALYSIS OF A PART SURFACE

(71) Applicant: AutoForm Engineering GmbH, Pfäffikon (CH)

(72) Inventors: Waldemar Kubli, Pfäffikon (CH); Andreas Krainer, Pfäffikon (CH); Enrico Kravina, Pfäffikon (CH)

(73) Assignee: AutoForm Engineering GmbH, Pfäffikon (CH)

( * ) Notice: Subject to any disclaimer, the term of this patent is extended or adjusted under 35 U.S.C. 154(b) by 330 days.

(21) Appl. No.: 17/304,759

(22) Filed: Jun. 25, 2021

(65) Prior Publication Data
US 2021/0407064 A1    Dec. 30, 2021

(30) Foreign Application Priority Data

Jun. 26, 2020    (CH) ......................................... 773/20

(51) Int. Cl.
   *G06F 30/23*    (2020.01)
   *G06F 30/10*    (2020.01)
   (Continued)

(52) U.S. Cl.
   CPC .............. *G06F 30/23* (2020.01); *G06F 30/10* (2020.01); *G06T 7/001* (2013.01); *G06T 7/344* (2017.01);
   (Continued)

(58) Field of Classification Search
   CPC ...... G06F 30/23; G06F 2113/24; G06F 30/17; G06F 30/20; G06F 2111/10;
   (Continued)

(56) References Cited

U.S. PATENT DOCUMENTS

| 6,785,640 B1* | 8/2004 | Lu | G06F 30/23 |
| | | | 703/2 |
| 2010/0114350 A1* | 5/2010 | Kanai | G05B 19/4097 |
| | | | 700/98 |

(Continued)

FOREIGN PATENT DOCUMENTS

| DE | 102013018364 A1 | 5/2015 |
| EP | 2282166 B1 | 2/2011 |

*Primary Examiner* — Xiao M Wu
*Assistant Examiner* — Scott E Sonners
(74) *Attorney, Agent, or Firm* — Oppedahl Patent Law Firm LLC

(57) ABSTRACT

A computer-implemented method and device are directed to a geometric analysis of a result of a manufacturing process or of a simulation of a manufacturing process in which a part (14) is formed from a planar sheet of material by means of a tool (1). The result comprises result model, being a computer based representation of the part after the (real or simulated) manufacturing process. The method comprises the computer-implemented steps of
   retrieving the result model (2);
   retrieving a reference model (3), the reference model being a mesh based model derived from a CAD model representing a target shape of the part or a tool shape;
   determining an improved result model (33) by transforming the mesh of the reference model (3) to match the shape of the result model (2);
   performing a geometric analysis on the basis of the improved result model (33).

16 Claims, 4 Drawing Sheets

(51) Int. Cl.

| | |
|---|---|
| *G06F 113/24* | (2020.01) |
| *G06F 119/18* | (2020.01) |
| *G06T 7/00* | (2017.01) |
| *G06T 7/33* | (2017.01) |
| *G06T 7/37* | (2017.01) |
| *G06T 7/60* | (2017.01) |
| *G06T 17/20* | (2006.01) |
| *G06T 19/20* | (2011.01) |
| *G06V 10/75* | (2022.01) |
| *G06V 20/64* | (2022.01) |

(52) U.S. Cl.
CPC .................. *G06T 7/37* (2017.01); *G06T 7/60* (2013.01); *G06T 17/20* (2013.01); *G06T 19/20* (2013.01); *G06V 10/757* (2022.01); *G06V 20/653* (2022.01); *G06F 2113/24* (2020.01); *G06F 2119/18* (2020.01); *G06T 2200/04* (2013.01); *G06T 2207/30136* (2013.01); *G06T 2207/30164* (2013.01); *G06T 2219/2004* (2013.01); *G06T 2219/2021* (2013.01)

(58) Field of Classification Search
CPC .. G06F 2119/18; G06F 30/00; G06F 16/5854; G06F 30/10; G06T 17/20; G06T 19/20; G06T 2219/2021; G06T 2207/10028; G06T 2219/2004; G06T 17/00; G06T 17/205; G06T 2207/30164; G06T 7/344; G06T 19/00; G06T 7/60; G06T 2200/04; G06T 2200/08; G06T 2207/30136
See application file for complete search history.

(56) References Cited

U.S. PATENT DOCUMENTS

2018/0285487 A1* 10/2018 Wilcox .................... G06N 5/04
2018/0285500 A1* 10/2018 Wilcox .................. G06T 19/20

* cited by examiner

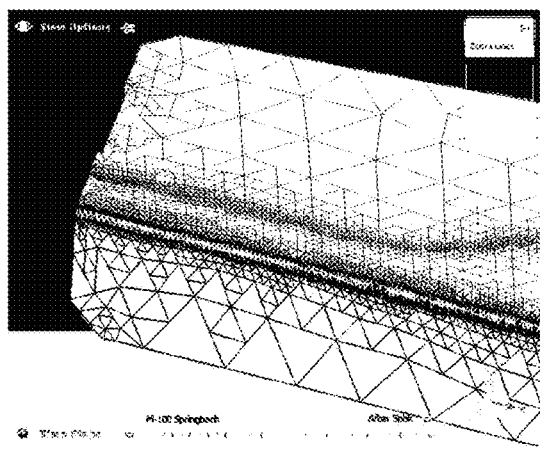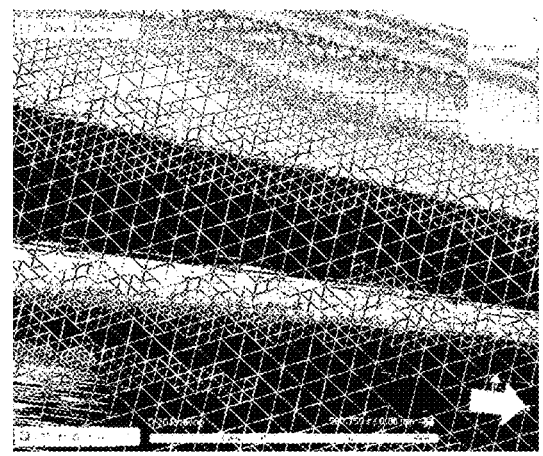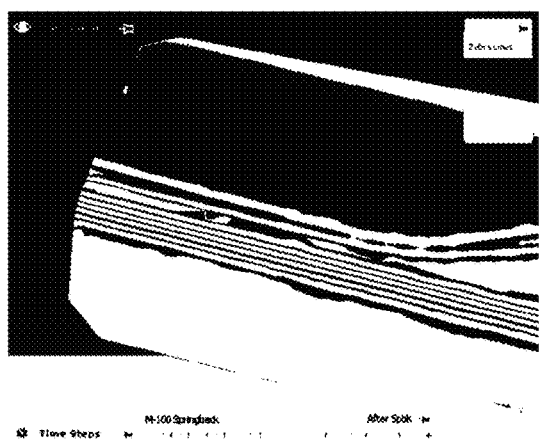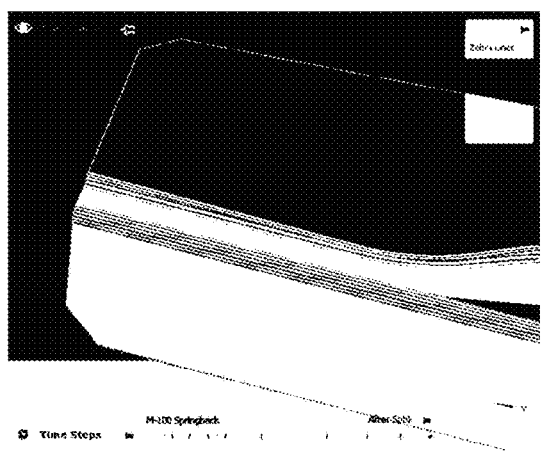
Fig. 5　　　　　　　　　　Fig. 6

METHOD AND DEVICE FOR GEOMETRIC ANALYSIS OF A PART SURFACE

The invention relates to the field of designing and manufacturing of parts, in particular of sheet metal parts, and tools for their manufacturing. It relates to a method for a geometric analysis of a result of a manufacturing process or of a simulation of a manufacturing process as described in the preamble of the corresponding independent claims.

BACKGROUND

U.S. Pat. No. 6,785,640 B1 presents, in the context of sheet metal forming of automobile parts, a method for evaluation surface quality by simulating the effects in a reflection machine. In a reflection machine or light tunnel, a plurality of light bars illuminates a part to be evaluated, and reflection lines visible to an observer serve to assess the quality of the part. According to U.S. Pat. No. 6,785,640 B1, the reflection lines are not observed on the real part, but are computed on the basis of a FEA (finite element analysis) model, also called FEM (finite element method) model of the part. The FEA model is created by a simulation of a stamping process. The reflection lines are also generated for a CAD model of the part, which represents the desired shape (or geometry) of the part. The reflection lines from the FEA model and the CAD model are displayed for comparison by a user, in order to allow the user to assess the quality of the shape represented by the FEA model with the target shape according to the CAD model.

However, tests have shown that when using the FEA model to compute the reflection lines, visual artefacts can distort the reflection lines. The quality of the computed reflection lines is degraded, and the user does not know whether a particular pattern is caused by the shape represented by the FEA model, or is just an artefact of the computation of the reflection lines.

EP 2 282 166 B1 discloses a method for displaying the surface of an object. The surface is measured with a 3D measurement system, and is compared to a corresponding CAD model of the surface. A "representation model" is generated by combining the measured surface data and the CAD model: In regions where they deviate, it is assumed that a defect is present and the CAD model is modified locally so as to represent the defect, that is, the measured shape in this region. In the remaining areas, the CAD model is not modified. The CAD model with the local modifications is used as the basis for visual analysis, for example by simulating the reflection of light sources or the surroundings of the part.

However, the method is limited in that in places where the CAD model is modified, the same issues with artefacts as described above can arise.

More generally, the problem is that a particular pattern that appears in the analysis can be caused either by the geometry (or shape), either of a real part or of a simulated part, or by artefacts of a computer representation of the real or simulated part.

It is therefore an object of the invention to create a method for geometric analysis of a result of a manufacturing process or of a simulation of a manufacturing process of the type mentioned initially, which overcomes the disadvantages mentioned above.

SUMMARY OF THE INVENTION

These objects are achieved by a method for geometric analysis of a result of a manufacturing process or of a simulation of a manufacturing process according to the independent claim.

The computer-implemented method serves for geometric analysis of a result of a manufacturing process or of a simulation of a manufacturing process, in particular in which a part is formed from a planar sheet of material, the result comprising a result model, the result model being a computer based representation of the part after the (real or simulated) manufacturing process. The method comprises the computer-implemented steps of
- retrieving the result model;
- retrieving a reference model, the reference model being a mesh-based model derived from a CAD model representing a design of the shape of the part after the manufacturing process or of the shape of a tool for manufacturing the part;
- determining an improved result model by transforming the mesh of the reference model to match the shape of the result model;
- performing a geometric analysis on the basis of the improved result model.

The CAD model or reference model, by representing the design of the part or the tool, represents a desired shape or target shape of the part, or the shape of the tool that gives rise to the desired shape of the part. The CAD model typically is the starting point for the design of the manufacturing process and the tools used in the manufacturing process, in particular tools used in a forming process. If the forming process involves effects such as springback, thermal distortion etc., then the final shape of the part can differ from the shape of the tool. In this case, the tool can be a compensated tool, shaped to produce the desired part shape after these effects. For compensated tools, the CAD model considered can be the CAD model of the tool. For not compensated tools, the CAD model considered can be the CAD model of the part, since its shape is essentially the same as (the negative of) the shape of the tool.

Given the real tool, the result of the manufacturing process is obtained by manufacturing the part. In this case, retrieving the result model can comprise acquiring a 3D representation of the real part by measurements. Given a computer model of the tool, the result of the manufacturing process is obtained by simulating the manufacturing process. In this case, retrieving the result model can comprise retrieving the result of simulating the manufacturing process.

The manufacturing process can be a forming process, an assembly process, or a combination of both.

A forming process can be, for example, a metal forming process such as sheet metal forming, hemming, forging, extrusion, rolling, etc.

In an assembly process, the part being considered is assembled from two or more sub-parts or component parts. Assembling the component parts can cause them to be deformed, and thus can also give rise to the need for analysing the geometry of the resulting part in view of its desired geometry.

The method presented herein, for analysing the result of a manufacturing process, is thus generally applicable to the geometric analysis of the shape of a part for which a computer-based reference model exists. The reference model typically is a CAD model, or a mesh-based model that is derived from a CAD model.

The CAD model of a part is as a rule built from geometric primitives, that is, 3D surface or volume elements. Geometric primitives can include, on a lower level, points, lines and line segments, circles and ellipses, triangles, polygons, spline curves, Non-Uniform Rational B-Spline (NURBS) curves etc. On a higher level, geometric primitives can include spheres, cubes or boxes, toroids, cylinders, pyramids etc. The primitives can be defined by analytic functions.

When generating a mesh-based representation of the part on the basis of primitives of the CAD model, the mesh can be aligned with the shape of the primitives. For example, mesh points will be placed on boundary lines between geometric primitives, and mesh edges will follow such boundary lines. Depending on a local shape of the CAD model, e.g. with regard to curvature of surfaces, the spatial resolution of the mesh is adapted to the shape by decreasing the distance between mesh points. Conversely, for flat areas, the resolution is reduced. Mesh discretisation can be controlled by specifying a maximum 3D chordal error between the analytic primitives and the mesh approximation.

Consequently, the mesh model based on the CAD model is well suited for an analysis of the part's geometry: since the mesh is aligned with the features of the part, the quality of the approximation by the mesh is high, and the analysis will yield good results in areas where the shape of the part corresponds to areas in which, for example, primitive surfaces are joined.

As opposed to this, mesh-based models that are the result of a simulation of a forming process are not aligned with the part features. This is because, on the one hand, the initial mesh is created for a flat blank whose deformation then is simulated. More generally, the displacement of mesh points—which correspond to points in the material of the part—by the simulation will move them to other points in space. A section of the mesh will move to another region of the part where it no longer is aligned with the features in that region. On the other hand, the simulation can perform a mesh refinement in regions where the accuracy of the simulation needs to be increased. Mesh points resulting from such a refinement generally have, at the point where they end up in the course of the simulation, no relation to the features of the part either.

Likewise, mesh-based models that are based on measurements of a real part are not aligned with the part features. Typically, such a model is based on a point cloud generated with a 3D-scanner—mechanical or optical—from the real part.

In both cases, that is, for a result model that is the result of either a simulation or of a measurement, when mesh points are joined by mesh edges, then these mesh edges will generally not align with the part features. For example, a straight edge of the real or simulated part will be represented by a sequence of mesh edges running in a zig-zag line. An analysis on the basis of this representation of the edge can create artefacts that render the analysis result unusable.

By transforming the mesh of the reference model—representing the CAD model representing the design of the shape of the part after the manufacturing process or of the shape of a tool for manufacturing the part—to an improved result model that matches the shape of the result model, the alignment of the CAD model mesh with features of the part can be maintained. Mesh points and mesh edges can be mapped, for example, to corresponding edges of the result model. The edges of the result model are represented in the improved result model with a higher accuracy than in the result model, and an analysis on the basis of the improved result model can comprise fewer or less pronounced artefacts.

In embodiments in which the result model has been determined by measurements, that is, by acquiring a 3D representation of a real part by measurements, the feature aligned improved result model can be used as the basis of a simulation of further operations involving the part. Such simulated further operations can be, for example, forming operations, or assembly operations in which the part is combined with other parts.

In embodiments, determining the improved result model by transforming the mesh of the reference model to match the shape of the result model is accomplished by the steps of
  determining a matched result model by transforming, by a matching transformation, the mesh of the result model to match the shape of the reference model;
  determining a mapped reference model
    by determining an intermediate projected reference model by projecting the mesh points of the reference model onto the matched result model, and determining the mapped reference model by mapping the mesh points of the intermediate projected reference model onto the result model; or
    by transforming the mesh points of the reference model with the inverse of the matching transformation;
  determining the improved result model by
    setting the improved result model to be equal to the mapped reference model, or
    only if an intermediate projected reference model has been determined, determining, for each mesh point of the mapped reference model, a difference vector between the position of the corresponding mesh points in the reference model and the intermediate projected reference model, and adding this difference vector to said mesh point in the mapped reference model, resulting in a corresponding mesh point of the improved result model.

Transforming the mesh of a first model to match the shape of a second model determines a correspondence between models representing similar shapes by deforming the mesh of the first model such that it represents the shape of the second model (except for discretisation errors). In most cases, such a transformation is non rigid.

In embodiments, the first model is the reference model and the second model is the result model.

In embodiments, the first model is the result model and the second model is the reference model, and further steps can be performed to refine the mesh of the registered result model, that is, of the matched result model.

In embodiments, transforming the mesh of a first model to match the shape of a second model; comprises registering the first model, to the second model; by means of a non-rigid registration transformation (T). In this case, the registration transformation constitutes the matching transformation.

In embodiments, the non-rigid registration transformation is a non-rigid mesh registration transformation. In embodiments, the non-rigid registration transformation is a non-rigid point set registration transformation. Known methods for mesh and point set registration, also known as point set matching, can be used.

In embodiments, transforming the mesh of a first model to match the shape of a second model comprises identifying features of the first model and features of the second model, matching features of the first model to corresponding features of the second model, and determining a transformation that maps features of the first model to corresponding features of the second model. In this case, this transformation constitutes the matching transformation.

Identifying and matching features can be accomplished, for example, on the basis of curvature analysis, that is, on the basis of surface shape classes and associated parameters. Matching features takes into account on the one hand parameter values that characterise the features and on the other hand the relative location of the features on the part.

In embodiments, the method comprises determining the intermediate projected reference model by projecting each mesh point of the reference model onto the matched result model in the direction of a surface normal at this mesh point on the reference model or on the matched result model.

In embodiments, the method comprises determining the mapped reference model by mapping mesh points of the intermediate projected reference model back onto the result model by a transformation by which the mesh points of the matched result model (which are also points of the intermediate projected reference model) are transformed back to their original location in the result model. This transformation can be the inverse of the matching transformation.

In embodiments, the method comprises determining the mapped reference model by mapping each particular mesh point of the intermediate projected reference model back onto the result model by an associated local affine transformation, wherein the local affine transformation associated with this particular mesh point is the affine transformation that transforms mesh elements that correspond to mesh elements in the result model, and that define the part of the mesh in which this particular mesh point lies, back to their original location in the result model.

In embodiments, the method comprises the steps of determining, for each mesh point of a plurality of mesh points of the improved result model, a corresponding surface normal vector in that mesh point by,
- in a simulation of the manufacturing process, determining the shape of the part before springback, and the shape of the part after springback;
- for each mesh point of the plurality of mesh points of the improved result model, determining corresponding points and surface normals ($n_a$, $n_b$) on the shape before and after springback, and determining a difference vector angle ($n_a$-$n_b$) by which the surface normal ($n_a$) after springback differs from the surface normal ($n_b$) before springback,
- changing the surface normal vector in the mesh point of the improved result model by the difference vector angle ($n_a$-$n_b$).

In embodiments, the method comprises the steps of determining, for each mesh point of a plurality of mesh points of the improved result model, a corresponding surface normal vector in that mesh point by
- for each mesh point of the plurality of mesh points of the improved result model, determining corresponding points and surface normals in the result model and the matched result model, and determining an associated difference vector by which the surface normal in the matched result model differs from the surface normal in the result model;
- optionally performing a smoothing operation on the difference vectors,
- for each mesh point of the plurality of mesh points of the improved result model, setting the surface normal vector equal to the vector sum of the normal of the associated point of the reference model and the associated difference vector, or smoothed difference vector, as the case may be.

In embodiments, difference vector angle is determined by translating the surface normal vectors, which are unit vectors, to have a common point of origin and determining the difference vector between them.

In embodiments, smoothing the difference vectors is accomplished by replacing, for a chosen point of the model, the corresponding difference vector by an average of the difference vectors of surrounding points that lie in a region around the chosen point. The average can be a weighted average, with weights decreasing as the distance of a surrounding point from the chosen point increases.

In embodiments, performing the geometric analysis on the basis of the improved result model comprises a surface quality analysis, in particular at least one of
- determining reflection lines on the improved result model, in particular zebra lines;
- performing a curvature analysis on the improved result model.

In embodiments, the curvature analysis comprises computing principal curvatures in a plurality of points of the improved result model. It can further comprise displaying the principal curvatures, or only the principal curvature with the largest value, in a graphical representation. Displaying a principal curvature can be done by displaying its direction and/or its magnitude. The display can represent values of the direction and/or magnitude by arrows and/or by colours or shadings associated with the values. The graphical representation can be superimposed on a graphical representation of the part.

Depending on the type of part, it may be required that curvatures should change smoothly, not stepwise. The curvature analysis provides a tool for assessing such requirements.

In embodiments, the curvature analysis comprises determining a surface shape class for one or more regions of the part, based on the improved result model. The surface shape class is used to characterise the local shape of a surface on the basis of the two principal curvatures K1, K2 in a point of the surface. A possible classification is, assuming that convex surfaces are defined to have positive curvature:
K1<0, K2<0: concave ellipsoid;
K1=0, K2<0 or K1<0, K2=0: concave cylinder;
K1=0, K2=0: plane;
K1>0, K2<0 or K1<0, K2>0: hyperboloid surface;
K1=0, K2>0 or K1>0, K2=0: convex cylinder;
K1>0, K2>0: convex ellipsoid.

Other possible classifications into surface shape classes are, taking into account the magnitude of the principal curvatures, for example:
planar, spherical, conical, cylindrical and catenoidal, or
planar, cylindrical and spherical.

Curvature analysis can also be used to identify features of two models that are then used for matching corresponding features of the two models.

In embodiments, performing the geometric analysis on the basis of the improved result model comprises a comparison between the improved result model and the reference model, in particular at least one of
- determining, at a plurality of points, the spatial distance between corresponding points of the improved result model and the reference model;
- determining, at a plurality of points of the improved result model and the reference model, values of a particular parameter (typically scalar parameters, for example, the maximal principal curvature) in these points, and the difference in value between corresponding points in the two models;
- determining, for a plurality of points of the improved result model and of the reference model respectively, a surface shape class, and determining areas in which the surface shape class of the improved result model and the reference model differ from one another.

In embodiments, the geometric analysis on the basis of the improved result model comprises a computation of the draw angle for a plurality of points of the improved result model.

The draw angle is the angle between the working direction of the tool and the surface of the part. A graphical representation of the draw angle in each of the plurality of points can be superimposed on a graphical representation of the part.

In embodiments, the method described herein is included in a method for designing a tool for manufacturing a part, comprising performing the steps for geometric analysis of the part at least once, modifying at least one of the tool and the reference model depending on an outcome of the geometric analysis, and manufacturing the tool for manufacturing the part as defined by the modified tool and/or reference model.

In embodiments, the method described herein is included in a method for designing a part, comprising performing the steps for geometric analysis of the part at least once, modifying at least one of the tool and the reference model depending on an outcome of the geometric analysis, and manufacturing the part as defined by the modified tool and/or reference model.

Manufacturing the part can involve an assembly step. In embodiments, a part is manufactured such that a springback effect after assembly is compensated for, so that after springback the part is in a desired target shape.

A data processing system can be programmed to execute a procedure as described herein. It comprises a storage device for storing and retrieving computer readable data representing at least the result model, the reference model and the improved result model, and a processing device for performing the method steps for determining at least the improved result model.

In an embodiment, a computer program for the geometric analysis of a result of a manufacturing process or of a simulation of a manufacturing process is loadable into an internal memory of a digital computer or a computer system, and comprises computer-executable instructions to cause one or more processors of the computer or computer system execute the method for the geometric analysis of a result of a manufacturing process or of a simulation of a manufacturing process. In another embodiment, a computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

A method of manufacturing a non-transitory computer readable medium comprises the step of storing, on the computer readable medium, computer-executable instructions which when executed by a processor of a computing system, cause the computing system to perform the method for the geometric analysis of a result of a manufacturing process or of a simulation of a manufacturing process.

Further embodiments are evident from the dependent patent claims. Features of the method claims may be combined with features of the device claims and vice versa.

DESCRIPTION OF THE DRAWING

The subject matter of the invention will be explained in more detail in the following text with reference to exemplary embodiments which are illustrated in the attached drawing, which schematically shows:

FIGS. 5-6 surface quality analysis with different methods.

In principle, identical parts are provided with the same reference symbols in the figures.

DETAILED DESCRIPTION

Figure 1:
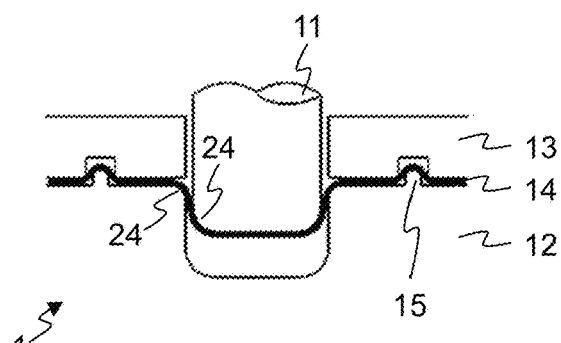
FIG. 1 a tool for forming a part by deep drawing.

FIG. 1 shows a tool 1 for forming a part 14, the tool 1 comprising a punch 11 and a die 12. The part 14 is held against the die 12 by means of a blank holder 13. The tool 1 is arranged in a forming press, not shown. During the forming operation, the part 2 is held by the blank holder 13, the punch 11 is moved towards the die 12, or vice versa, and the part 14 is formed according the shape of the tool 1. This involves pulling and stretching the part 14 over radii 24 of the tool 1. In order to control the flow of the part material, drawbeads 15 can be arranged at the periphery of the tool 1, holding back the flow of material. The tool shown corresponds to a deep drawing forming operation, but the method for geometric analysis are applicable to other forming methods and assembly methods too. The shape of the part is not uniquely determined by the shape of the tool 1, but is also determined by effects such as springback, thermal distortion, thickening and thinning of the material by the forming process, etc.

The part 14 can be formed in a single forming operation or through a sequence of two or more forming operations. The following pertains to a part resulting from one or more forming and/or assembly operations that shall be considered to be the desired result part for the purpose of the present invention, even if it is the case that the part is processed in subsequent steps.

Figure 2:
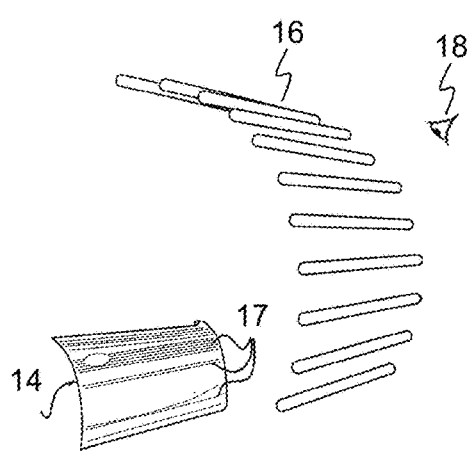
FIG. 2 a formed part in a light tunnel.

FIG. 2, adapted from U.S. Pat. No. 6,785,640 B1, shows a part 14 after forming, arranged to be illuminated by light bars 16, which can be part of a light tunnel. The light bars 16 are reflected on the part 14, thereby creating reflection lines 17 seen by an observer at view point 18. In order to avoid the necessity of manufacturing the part, treating its surface and arranging it in the light tunnel, the pattern created by the reflection of the light bars 16 on the part 14 and its projection to the view point 18 can be computed as shown in U.S. Pat. No. 6,785,640 B1.

Figure 3:
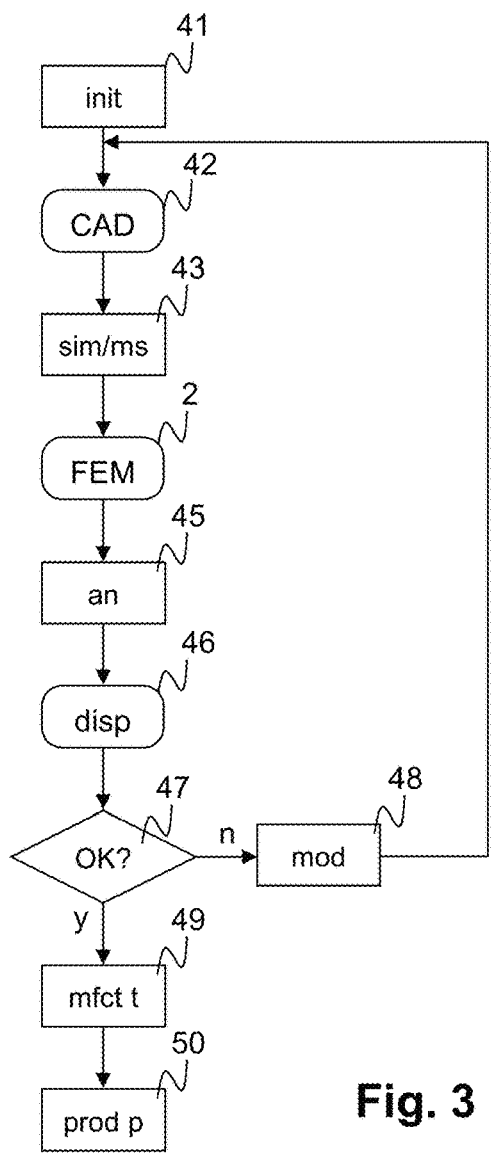
FIG. 3 a flow diagram of a method without the inventive procedure.

FIG. 3 shows a flow diagram of a method that does not make use of the inventive procedure: in an initialisation step 41, a CAD model 42 defining the desired geometry of a part or tool is created. In a result model acquisition step 43, a result model 2 in the form of a FEM model of the part after a manufacturing operation is acquired. This can be done by simulating the manufacturing process in which the part is formed or assembled, or by actually manufacturing the real part and acquiring a 3D representation of the real part by measurements.

Methods for such simulations are generally known. They typically but not necessarily are FEM based, and can be based on only the geometry of the part, or in addition also on the geometry of the tool and operating parameters of the tool. The part is modelled as comprising a finite number of material points arranged in a grid or mesh, and the behaviour of the part is determined for each of these material points, also called simulation points. Results of such a simulation can include a state of the material after the forming operation, and the geometry of the part, that is, the shape of the part. The state can comprise stresses of the material in each simulation point, and other state variables such as strain, temperature, friction forces acting on the part.

In an analysis step 45, a geometric analysis is performed, that is, an analysis based on the geometry of the part alone—as opposed to material-related state variables, such as stresses, strain etc. Analysis results 46 are stored or displayed to a user. Based on the analysis results, a decision 47 is taken, by the user or by an automated process, to either perform a modification 48 of the tools and/or the CAD model 42 and repeat the procedure iteratively, or to stop the execution of the method. The result can be an optimised design with respect to the part, the tool and/or the process. The modification 48 itself can be performed by a user, based on the analysis results. Modifying the tool can comprise, for example, modifying the shape in order to compensate for springback and other effects, modifying the clearance between punch and die, modifying holding forces, the location and size of draw beads, etc. The method can continue by manufacturing 49 the real tool 1 and optionally also by subsequently producing 50 the real part corresponding to the design defined by the CAD model.

Figure 4:
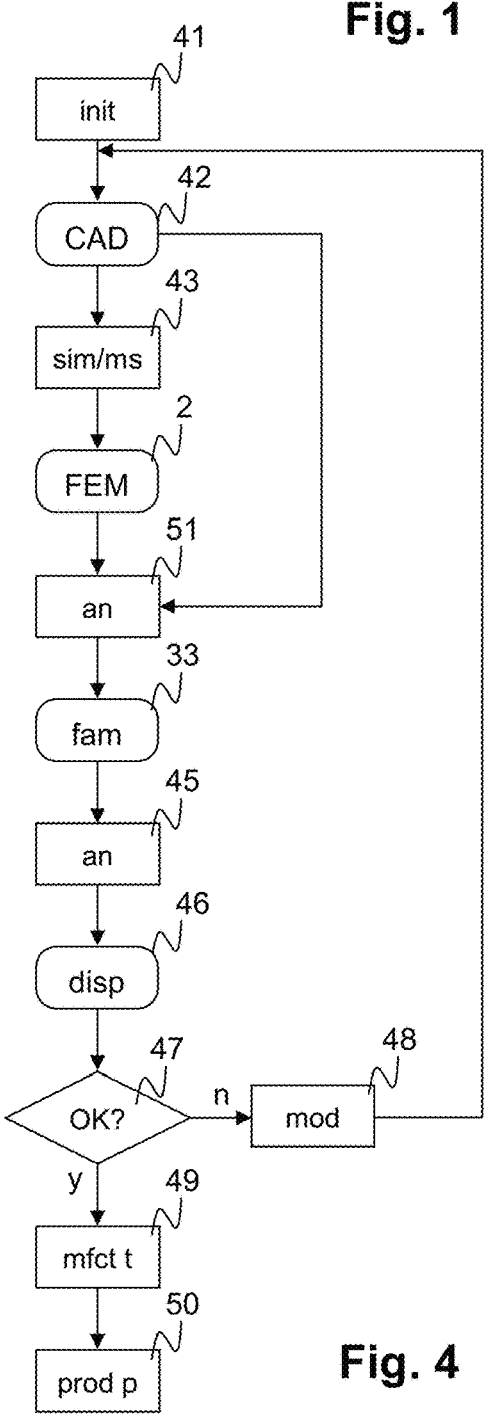
FIG. 4 a flow diagram of a method incorporating the inventive procedure.

FIG. 4 shows a flow diagram of a method incorporating the inventive procedure: in addition to the steps already presented in relation to FIG. 3, the method comprises, after the FEM model is determined, corresponding to a result model 2, an additional step of determining 51 an improved result model 33 in which the mesh is aligned with the features. The improved result model 33 is determined by combining the FEM model or result model 2 with the mesh-based reference model 3 derived from the CAD model 42. The feature aligned improved result model 33 is then used in the analysis step 45.

The analysis step 45 can comprise a simulation, in particular an FEM based simulation, of an operation involving the part, in particular a forming or assembly operation. This is particularly the case if the result model 2 has been determined by measurements.

FIGS. 5 and 6 show two cases with exemplary results of the inventive procedure. They show, from top to bottom,
- a mesh of a FEM model of the part, corresponding to a result model 2;
- the result of the analysis step 45 determining reflection lines, or zebra lines on the basis of the FEM model or result model 2;
- the result of the analysis step 45 determining reflection lines, or zebra lines on the basis of the improved result model 33.

In both cases it is evident that the middle row shows visual artefacts that reduce the quality of an assessment based on such a representation. FIG. 5 shows artefacts caused by normal vectors in the mesh points not being properly aligned. FIG. 5 shows artefacts caused by the mesh size of the FEM model being too large in certain areas. Further artefacts, not illustrated, can be caused by the mesh of the FEM model not being aligned with the features of the part.

Figure 7:
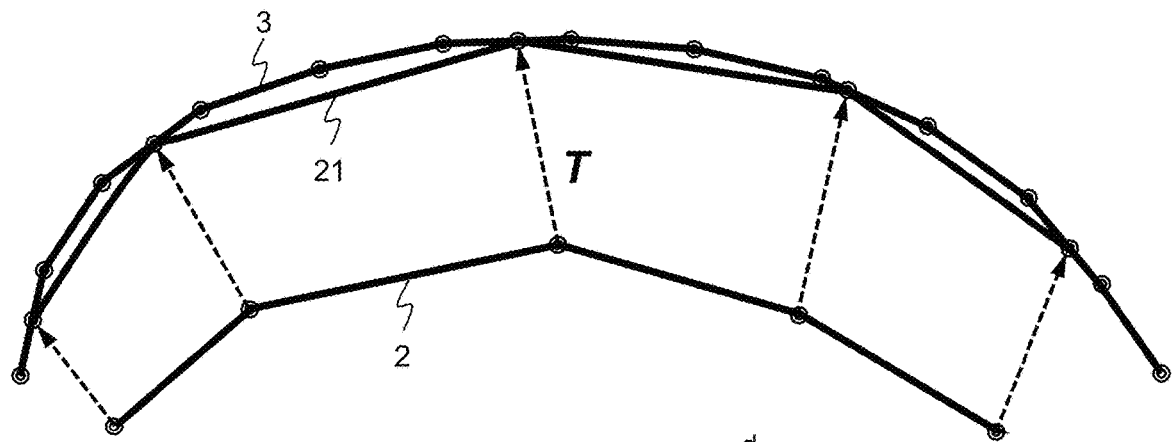
FIG. 7-10 relations between models transformed and combined by the method.

FIGS. 7-10 illustrate steps for determining an improved result model 33 by transforming the mesh of the reference model 3 to match the shape of the result model 2. FIG. 7 shows a first step, given the result model 2 and the reference model 3. The result model 2 can be the result of the simulation of the manufacturing process, or can be determined from measurements of a real part. Such measurements correspond to point clouds and can be represented by STL (Standard Triangulation/Tesselation Language) files. For example, the reference model 3 represents the desired geometry or shape of the part. In the first step, the mesh of the result model 2 is transformed to match the shape of the reference model 3, which results in a matched result model 21. A corresponding transformation T can be determined as a non-rigid registration transformation, or by determining features in both the result model 2 and reference model 3 and matching them with one another.

Figure 8:
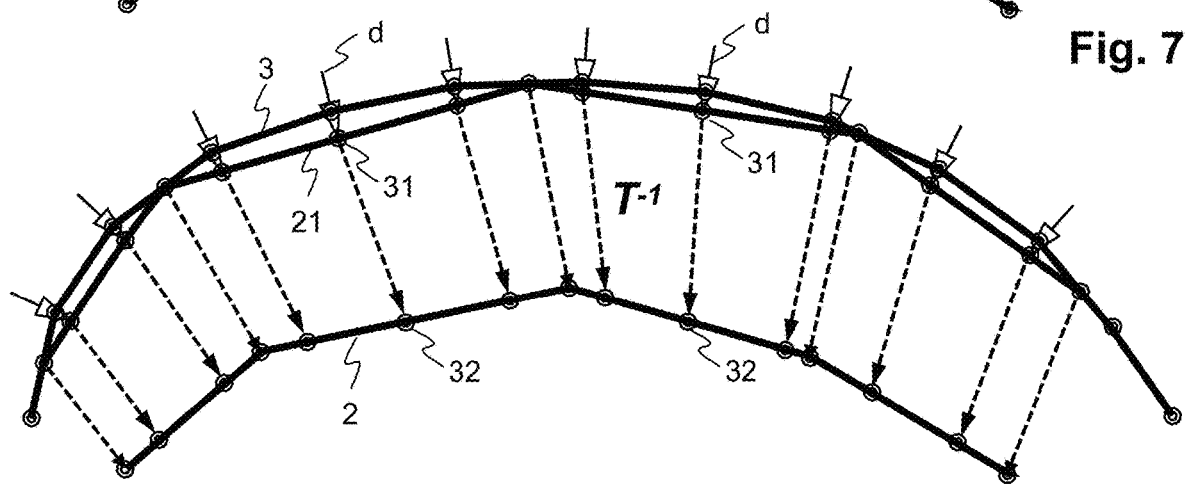

FIG. 8 shows a next step, in which mesh elements, in particular mesh points or nodes of the reference model 3 are first projected onto the matched result model 21. The direction of the projection can be along normal vectors defined by either the reference model 3 or by the matched result model 21. This projection creates an intermediate projected reference model 31 having a mesh corresponding to the shape of the matched result model 21, but with the resolution of the reference model 3. Thereby, a refinement of the mesh—compared to the mesh of the matched result model 21—is achieved for regions in which the reference model 3 according to the design of the part has a higher spatial resolution. Thus, the mesh can be refined in areas in which according to the design information that is implicit in the CAD reference model 3 a high resolution is required, although this information may have been lost in the course of the simulation or measurement procedure underlying the result model 2.

The intermediate projected reference model 31 is then mapped back onto the result model 2. This creates a mapped reference model 32. Depending on how the matched result model 21 was obtained, the mapping back to the result model 2 can be accomplished in different ways. For example, the projection can be the inverse of a transformation T that was determined to transform the result model 2 is transformed to match the shape of the reference model 3. The mapping can be determined locally, on a level of mesh elements, for example as the inverse of a transform, in particular an affine transform—that was used to transform the result model 2 to the matched result model 21 for a mesh region or just a mesh triangle in which a point to be mapped back to the result model 2 lies.

The mapped reference model 32 can be used as the improved result model 33 for the subsequent analysis step.

Figure 9:
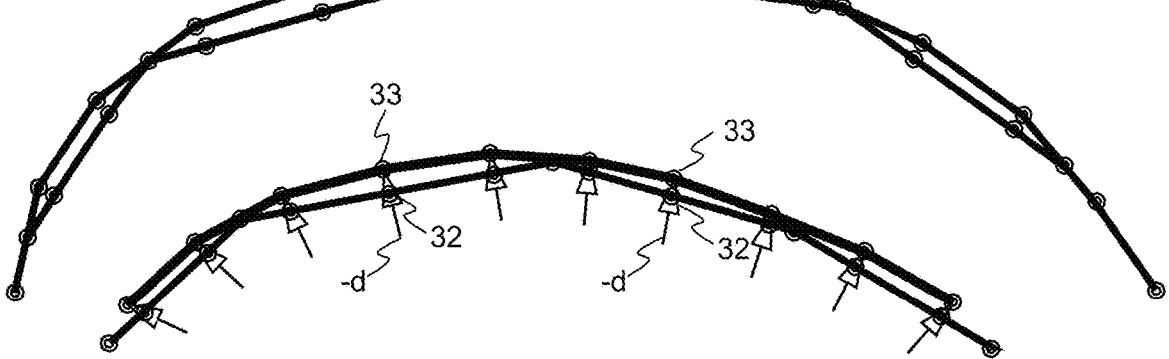
Figure 10:
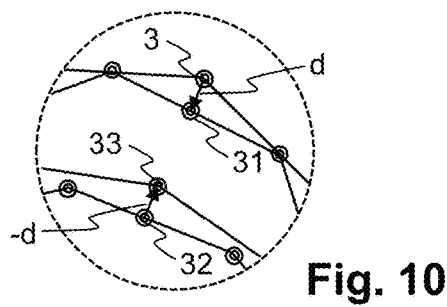

In embodiments, the mapped reference model 32 is further modified by correcting for chordal errors, shown in FIG. 9. This is done by considering, for each point, a difference vector d corresponding to a displacement of the corresponding point of the reference model 3 by projecting it onto the matched result model 21 (creating a point of the intermediate projected reference model 31), and by displacing the point of the mapped reference model 32 by the opposite −d of this difference vector. This creates the improved result model 33. FIG. 10 shows a detail view of the relations involving the difference vector d. In FIGS. 8 and 9, difference vectors d are indicated for different points, and it is understood that the actual values of these vectors differ from point to point.

In embodiments, transforming the mesh of the reference model 3 to match the shape of the result model 2 is accomplished by the steps of
- determining a matched result model 21 by registering the result model 2 to the reference model 3;
- determining an intermediate projected reference model 31 by projecting the mesh points of the reference model 3 onto the matched result model 21;

determining a mapped reference model 32 by mapping the mesh points of the intermediate projected reference model 31 onto the result model 2;

determining the improved result model 33 by determining, for each mesh point of the mapped reference model 32, a difference vector between the position of the corresponding mesh points in the reference model 3 and the intermediate projected reference model 31, and adding this difference vector to said mesh point in the mapped reference model 32, resulting in a corresponding mesh point of the improved result model 33

In alternative embodiments, the improved result model 33 is determined directly by transforming the mesh of the reference model 3 to match the shape of the result model 2.

Figure 11:
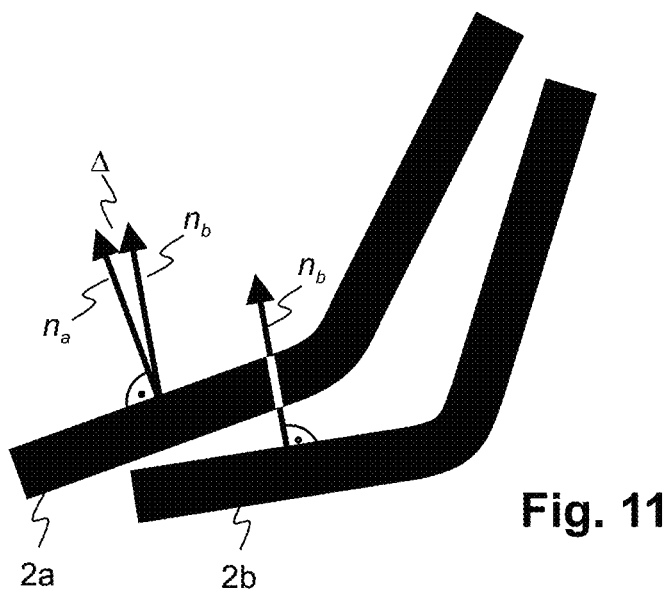
FIG. 11 computation of normal vectors based on springback.

FIG. 11 illustrates a computation of normal vectors to be used in the improved result model 33. Given the situation in the lower part of FIG. 9, after the improved result model 33 has been determined, it has in each mesh point a normal vector that represents the orientation of a tangent surface in this point. Typically, the normal vector in a mesh point is determined as a weighted average of the normal vectors of the mesh faces adjacent to the mesh point, with the weight being inversely proportional to the distance of the centre of the face from the mesh point.

Experiments show that with the normal vectors being determined in this way, artefacts arise when analysing the geometry based on the improved result model 33. Artefacts can be reduced by adapting the normal vectors as follows.

If the result model 2 has been determined by a simulation of the forming process, the normal vectors can be adapted as follows: in the simulation, the geometry of the part before springback $2b$ and after springback $2a$ is determined. For each mesh point of the improved result model 33 for which the normal is to be adapted, the corresponding material point in the simulation model is determined, together with a direction of the normal $n_b$ in this point before springback and the normal $n_a$ after springback. The normals can be expressed by unitary vectors $n_a$, $n_b$. The difference between the two normals can be expressed by a vector difference $n_a-n_b$. The normal vector $n_{improved}$ in the improved result model 33 is adapted by adding this vector difference to the normal vector $n_{CAD}$ of the corresponding point in the CAD model (from which the reference model 3 is derived), thus $$n_{improved}=n_{CAD}+(n_a-n_b)$$

For non-compensated tools, the normal vectors $n_{CAD}$ are those of the CAD model of the part geometry. For compensated tools, the normal vectors $n_{CAD}$ are those of the CAD model of the tool geometry.

This method for adapting surface normal vectors based on the shape of the part after springback can be applied to the improved result model 33 regardless of whether it was determined directly by transforming the reference model 3, or via the matched result model 21.

Figure 12:
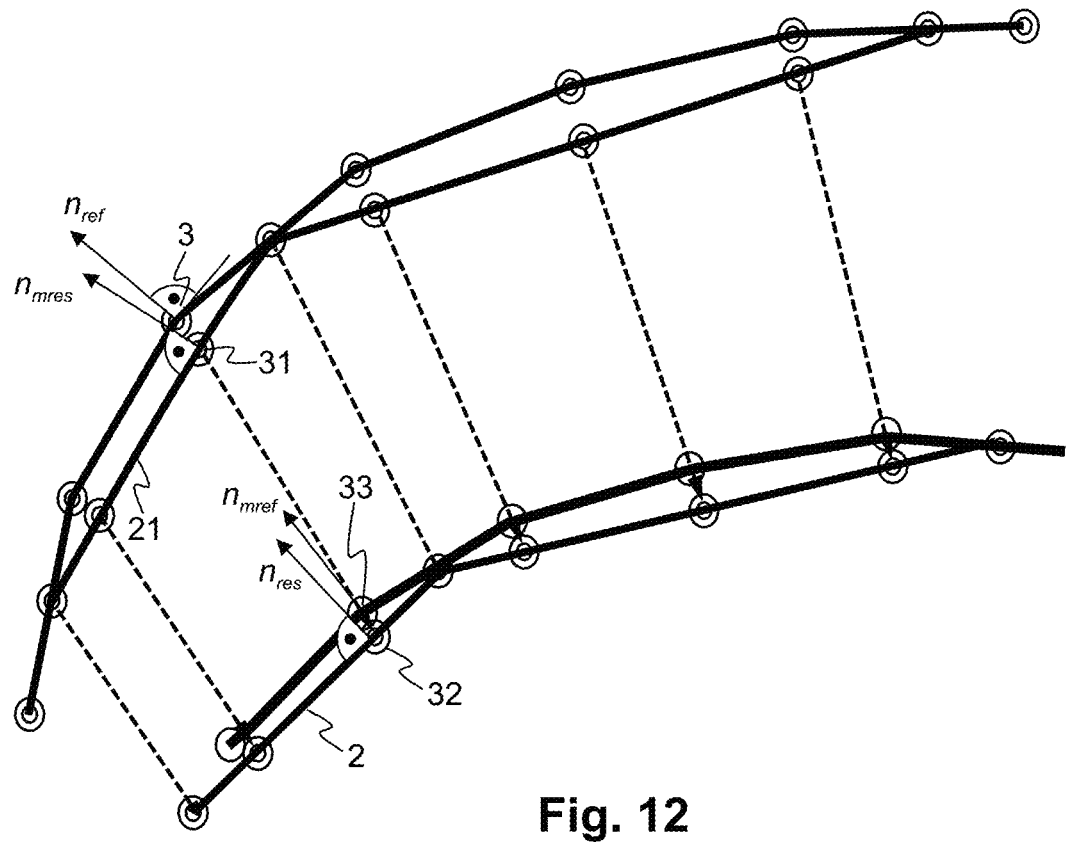
FIG. 12 computation of normal vectors based on a matching transformation.

In another embodiment, that is also applicable if the result model 2 has been determined by a measurement, or if information on springback is not available, the normal vectors can be adapted as follows, as illustrated in FIG. 12:

for each mesh point of the plurality of mesh points of the improved result model 33, determining corresponding points and surface normals $n_{res}$ in the result model 2 and corresponding points and surface normals $n_{mres}$ in the matched result model 21. These points can be identical to corresponding mesh points of the mapped reference model 32 (because these points lie on the result model 2) and, respectively, of the intermediate projected reference model 31 (because these points lie on the matched result model 21).

determining an associated difference vector $n_{res}-n_{mres}$ by which the surface normal in the matched result model 21 differs from the surface normal $n_{res}$ in the result model 2.

optionally performing a smoothing operation on the difference vectors, for each mesh point of the plurality of mesh points of the improved result model 33, setting the surface normal vector $n_{mref}$ equal to the vector sum of the normal $n_{ref}$ of the associated point of the reference model 3 and the associated difference vector, or smoothed difference vector, as the case may be.

Thus, $$n_{mref}=n_{ref}+(n_{res}-n_{mres})$$

While the invention has been described in present embodiments, it is distinctly understood that the invention is not limited thereto, but may be otherwise variously embodied and practised within the scope of the claims.

The invention claimed is:

1. A computer-implemented method for geometric analysis of a result of a manufacturing process or of a simulation of a manufacturing process in which a part is formed, in particular from a planar sheet of material, the result comprising a result model, the result model being a computer based representation of the part after the manufacturing process, the method comprising the computer-implemented steps of retrieving the result model;

retrieving a reference model, the reference model being a mesh-based model derived from a CAD model representing a design of the shape of the part after the manufacturing process or of the shape of a tool for manufacturing the part, wherein the CAD model comprises geometric primitives, that is, 3D surface or volume elements, wherein the reference model is generated on the basis of the primitives of the CAD model, and the mesh of the reference model is aligned with the shape of the primitives, with mesh points placed on boundary lines between geometric primitives, and mesh edges following such boundary lines, wherein for every boundary line between geometric primitives it is the case that the entirety of the boundary line is followed by mesh edges, the mesh edges connecting mesh points lying on the boundary line;

determining an improved result model by transforming the mesh of the reference model to match the shape of the result model;

performing a geometric analysis on the basis of the improved result model.

2. The method of claim 1, wherein determining the improved result model by transforming the mesh of the reference model to match the shape of the result model is accomplished by the steps of determining a matched result model by transforming, by a matching transformation, the mesh of the result model to match the shape of the reference model;

determining a mapped reference model by determining an intermediate projected reference model by projecting the mesh points of the reference model onto the matched result model, and determining the mapped reference model by mapping the mesh points of the intermediate projected reference model onto the result model; or by transforming the mesh points of the reference model with the inverse of the matching transformation;
determining the improved result model by
setting the improved result model to be equal to the mapped reference model, or
only if an intermediate projected reference model has been determined, determining, for each mesh point of the mapped reference model, a difference vector between the position of the corresponding mesh points in the reference model and the intermediate projected reference model, and adding this difference vector to said mesh point in the mapped reference model, resulting in a corresponding mesh point of the improved result model.

3. The method of claim 2, comprising determining the intermediate projected reference model by projecting each mesh point of the reference model onto the matched result model in the direction of a surface normal at this mesh point on the reference model or on the matched result model.

4. The method of claim 2, comprising determining the mapped reference model by applying the inverse of the matching transformation to the mesh points of the intermediate projected reference model, in particular by mapping each particular mesh point of the intermediate projected reference model back onto the result model by an associated local affine transformation, wherein the local affine transformation associated with this particular mesh point is the affine transformation that transforms mesh elements that correspond to mesh elements in the result model, and that define the part of the mesh in which this particular mesh point lies, back to their original location in the result model.

5. The method of claim 1, wherein transforming the mesh of a first model to match the shape of a second model comprises registering the first model, to the second model by means of a non-rigid registration transformation.

6. The method of claim 1, wherein transforming the mesh of a first model to match the shape of a second model comprises identifying features of the first model and features of the second model, matching features of the first model to corresponding features of the second model, and determining a transformation that maps features of the first model to corresponding features of the second model.

7. The method of claim 1, comprising the steps of determining, for each mesh point of a plurality of mesh points of the improved result model, a corresponding surface normal vector in that mesh point by,
in a simulation of the manufacturing process, determining the shape of the part before springback, and the shape of the part after springback;
for each mesh point of the plurality of mesh points of the improved result model, determining corresponding points and surface normals on the shape before and after springback, and determining a difference vector angle by which the surface normal after springback differs from the surface normal before springback,
changing the surface normal vector in the mesh point of the improved result model by the difference vector angle.

8. The method of claim 1, comprising the steps of determining, for each mesh point of a plurality of mesh points of the improved result model, a corresponding surface normal vector in that mesh point by
for each mesh point of the plurality of mesh points of the improved result model, determining corresponding points and surface normals in the result model and a matched result model, and determining an associated difference vector by which the surface normal in the matched result model differs from the surface normal in the result model;
optionally performing a smoothing operation on the difference vectors,.
for each mesh point of the plurality of mesh points of the improved result model, setting the surface normal vector equal to the vector sum of the normal of the associated point of the reference model and the associated difference vector, or smoothed difference vector, as the case may be.

9. The method of claim 1, wherein performing the geometric analysis on the basis of the improved result model comprises a surface quality analysis, in particular at least one of
determining reflection lines on the improved result model, in particular zebra lines;
performing a curvature analysis on the improved result model.

10. The method of claim 1, wherein performing the geometric analysis on the basis of the improved result model comprises a comparison between the improved result model and the reference model, in particular at least one of
determining, at a plurality of points, the spatial distance between corresponding points of the improved result model and the reference model;
determining, at a plurality of points of the improved result model and the reference model, values of a particular parameter in these points, and the difference in value between corresponding points in the two models;
determining, for a plurality of points of the improved result model and of the reference model respectively, a surface shape class, and determining areas in which the surface shape class of the improved result model and the reference model differ from one another.

11. A method for designing a tool for manufacturing a part, comprising performing the steps of claim 1 for geometric analysis of the part at least once, modifying at least one of the tool and the reference model depending on an outcome of the geometric analysis, and manufacturing the tool for manufacturing the part as defined by the modified tool and/or reference model.

12. A method for designing a part to be manufactured using a tool, comprising performing the steps of claim 1 for geometric analysis of the part at least once, modifying at least one of the tool and the reference model depending on an outcome of the geometric analysis, and manufacturing the part as defined by the modified tool and/or reference model.

13. A data processing system programmed to execute a procedure according to claim 1, the data processing system comprising a storage device for storing and retrieving computer readable data representing at least the result model, the reference model and the improved result model, and a processing device for performing the method steps for determining at least the improved result model.

14. A computer program product loadable into an internal memory of a digital computer, comprising a non-transitory computer readable medium having computer program code recorded thereon, the computer program code to make, when said computer program code is loaded in the computer, the computer execute a procedure according to claim 1.

15. A method of manufacturing a non-transitory computer readable medium, comprising the step of storing, on the computer readable medium, computer-executable instructions which when executed by a processor of a computing system, cause the computing system to perform the method steps of claim 1.

16. A computer-implemented method for geometric analysis of a result of a manufacturing process or of a simulation of a manufacturing process in which a part is formed, in particular from a planar sheet of material, the result comprising a result model, the result model being a computer based representation of the part after the manufacturing process, the method comprising the computer-implemented steps of retrieving the result model;

retrieving a reference model, the reference model being a mesh-based model derived from a CAD model representing a design of the shape of the part after the manufacturing process or of the shape of a tool for manufacturing the part, wherein the CAD model comprises geometric primitives, that is, 3D surface or volume elements, wherein the reference model is generated on the basis of the primitives of the CAD model, and the mesh of the reference model is aligned with the shape of the primitives, with mesh points placed on boundary lines between geometric primitives, and mesh edges following such boundary lines, wherein for straight boundary lines between geometric primitives it is the case that each such straight boundary line is followed by mesh edges running along said straight boundary line in a straight line, the mesh edges connecting mesh points lying on said boundary line;

determining an improved result model by transforming the mesh of the reference model to match the shape of the result model;

performing a geometric analysis on the basis of the improved result model.

\* \* \* \* \*